(12) United States Patent
Hwang et al.

(10) Patent No.: US 8,492,998 B2
(45) Date of Patent: Jul. 23, 2013

(54) DRIVER CIRCUIT FOR DRIVING LIGHT-EMITTING ELEMENTS INCLUDING A POWER SWITCHING ELEMENT

(75) Inventors: Jong Tae Hwang, Seoul (KR); Seong Joon Park, Seoul (KR); Dae Ho Kim, Seoul (KR); Moon Sang Jung, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 143 days.

(21) Appl. No.: 13/206,239

(22) Filed: Aug. 9, 2011

(65) Prior Publication Data

US 2012/0049758 A1    Mar. 1, 2012

(30) Foreign Application Priority Data

Aug. 25, 2010  (KR) .................. 10-2010-0082660

(51) Int. Cl.
*G05F 1/00*      (2006.01)
*H05B 37/02*     (2006.01)
*H05B 39/04*     (2006.01)
*H05B 41/36*     (2006.01)
*H05B 39/02*     (2006.01)
*H05B 37/00*     (2006.01)
*H05B 39/00*     (2006.01)
*H05B 41/00*     (2006.01)

(52) U.S. Cl.
USPC ........ 315/297; 315/209 R; 315/226; 315/291; 315/307; 315/312

(58) Field of Classification Search
None
See application file for complete search history.

(56) References Cited

U.S. PATENT DOCUMENTS 6,864,641 B2 *   3/2005   Dygert .................... 315/216
7,804,258 B2 *   9/2010   Zhao ...................... 315/307

FOREIGN PATENT DOCUMENTS

| JP | 2006-353007 | 12/2006 |
| KR | 10-2009-0083782 A | 8/2009 |
| WO | WO 2007/069371 A1 | 6/2007 |

* cited by examiner

*Primary Examiner* — Douglas W Owens
*Assistant Examiner* — Dedei K Hammond
(74) *Attorney, Agent, or Firm* — Sherr & Jiang, PLLC

(57) ABSTRACT

A driver circuit is configured to drive light-emitting elements. The driver circuit includes a light-emitting element, a power switching element, a control circuit, and a charge pump circuit. The power switching element includes a first terminal connected to the light-emitting element and turns on and off the light-emitting element. The control circuit is connected to a second terminal of the power switching element and controls a switching operation of the power switching element. The charge pump circuit is connected between the control circuit and a power source for the light-emitting element and supplies current to the control circuit for driving the control circuit.

16 Claims, 12 Drawing Sheets

-Related Art-

-Related Art- (a) Without Charge Pump (b) With Charge Pump

DRIVER CIRCUIT FOR DRIVING LIGHT-EMITTING ELEMENTS INCLUDING A POWER SWITCHING ELEMENT

The present application claims priority under 35 U.S.C. §119 to Korean Patent Application No. 10-2010-0082660 (filed on Aug. 25, 2010), which is hereby incorporated by reference in its entirety.

BACKGROUND

In general, a driver circuit uses a controller for controlling light-emitting elements. In order to drive the controller, the driver circuit supplies power to the controller. The driver circuit may internally include a power supply circuit or use an external power source for power supply.

FIG. 1 is a circuit diagram that illustrates a typical driver circuit having a buck structure. Particularly, FIG. 1 illustrates an LED lamp driver circuit as an example of a driver circuit.

As illustrated in FIG. 1, the buck structure is a step-down structure. The driver circuit includes an inductor L 1, a freewheeling diode DFW 2, a power switch MSW 3, light emitting diodes LEDs 4, a current sensing resistor Rcs 5, a control circuit 6, a switching element 7, a resistor 8, a Zener diode DZI 9, and a $V_{DD}$ capacitor CVDD 10. The inductor 1, the freewheeling diode 7, and the LEDs 4 form a closed loop.

When the power switch 3 is turned on, current flows through the LEDs 4 and the LEDs 4 are turned on. When the power switch 3 is turned off, the current circulates in the closed loop formed of the inductor 1, the freewheeling diode 2, and the LEDs 4. The current sensing resistor 5 detects current flowing through the inductor 1 and the LEDs 4 when the power switch 3 is turned on. The current sensing resistor 5 is also connected to the control circuit 6 to control current flowing in the LEDs 4. The driver circuit necessarily includes an integrated circuit (IC) such as the control circuit 6 for driving the buck structure. The driver circuit requires a separate power source for driving the control circuit.

The high-voltage switching element 7 supplies or interrupts power to the control circuit 6 depending on switching operation thereof. The high-voltage switching element 7 implements a linear regulator that supplies voltage V2 to the control circuit 6 in proportional to voltage V1 supplied to the Zener diode 9. The $V_{DD}$ capacitor 10 is disposed between a power input terminal VDD of the control circuit 6 and ground. The $V_{DD}$ capacitor 10 removes noise.

As illustrated in FIG. 1, the driver circuit has a simple circuit structure that efficiently supplies power to the control circuit 6 depending on switching operation of the high-voltage switching element 7. The driver circuit, however, has a disadvantage of high power consumption, especially when power source voltage Vsup is high. The driver circuit also has a disadvantage of high manufacturing cost due to expensive high-voltage switching element 7.

FIG. 2 is a circuit diagram that illustrates a typical driver circuit having a transformer instead of an inductor. Unlike the driver circuit of FIG. 1, the driver circuit of FIG. 2 includes a transformer 10 instead of an inductor. The transformer 10 such as an X-former can generate power without requiring a high voltage switching element M1.

As illustrated in FIG. 2, the transformer 10 generates power and supplies it to a control circuit 60. When a power switch MSW 30 is turned off, current circulates in a closed loop formed of the transformer 10, a freewheeling diode DFW 20, and LEDs 40. The current turns on the freewheeling diode 20. Accordingly, a primary voltage V11 of the transformer 10 becomes approximately equal to a forward voltage VF of the LEDs 40.

The transformer 10 also generates a secondary voltage V12 having a voltage level corresponding to the turns ratio of the primary voltage V11. For example, the second voltage V12 is about N times lower than the primary voltage V11 when the turns ratio of the transformer 10 is N:1, where N is a natural number. The secondary voltage V12 of the transformer 10 causes current to flow through a diode DM 70 and charges a $V_{DD}$ capacitor CVDD 80, thereby supplying power to the control circuit 60.

The driver circuit of FIG. 2 has advantages of relatively low manufacturing cost and low power consumption as compared with the driver circuit of FIG. 2. The driver circuit of FIG. 2, however, has disadvantages as well. For instance, the driver circuit of FIG. 2 requires different types of transformers depending on the number of the LEDs 40. It is because a secondary voltage V12 is needed to supply power to the control circuit 60 and the second voltage V12 changes depending on the forward voltage VF of the LEDs 40. For example, if the number of the LEDs 40 changes then the load of the LEDs 40 changes. Such load variation causes changing the forward voltage VF of the LEDs 40. The driver circuit of FIG. 2, therefore, requires a transformer 10 having a different turns-ratio corresponding to the number of the LEDs 40.

As described above, the driver circuit of FIG. 2 requires a transformer having a different turns-ratio corresponding to the number of LEDs. Such a transformer has been manufactured through a complicated process as compared to the inductor. Accordingly, including a transformer could be disadvantage of the driver circuit of FIG. 2. In addition, it is required to appropriately set magnetizing inductance at the primary side of a transformer when the transformer is manufactured. If not, it could cause a problem in operation of a buck structure.

SUMMARY

Embodiments relate to a driver circuit for driving light-emitting elements, such as light emitting diodes.

Embodiments relate to a driver circuit including a first circuit for controlling light-emitting elements, such as light emitting diodes, and a second circuit for supplying power to the first circuit.

Embodiments relates to a driver circuit including a charge pump circuit.

In accordance with embodiments, a driver circuit is configured to drive light-emitting elements. The driver circuit includes at least the following: a light-emitting element, a power switching element, a control circuit, and a charge pump circuit. The power switching element includes a first terminal connected to the light-emitting element and turn on and off the light-emitting element. The control circuit is connected to a second terminal of the power switching element and control a switching operation of the power switching element. The charge pump circuit is connected between the control circuit and a power source for the light-emitting element and supply current to the control circuit for driving the control circuit.

The driver circuit in accordance with embodiments may further include a first resistance element connected to a third terminal of the power switching element. The control circuit may detect current flowing through the first resistance element and control the operation of the power switching element based on the detected current.

The charge pump circuit may be connected between a power supply terminal of the control circuit and a first node between the first terminal of the power switching element and the light-emitting element. The charge pump circuit may include a first charge storage element, a first switching element, and a second switching element. The first charge storage element may have a first terminal connected to the first node and a second terminal connected to the power supply terminal of the control terminal. The first switching element may have a first terminal connected to the first charge storage element in series and a second terminal connected to the power supply terminal of the control circuit. The second switching element may have a first terminal connected to the second node between the first terminal of the first switching element.

A second terminal of the second switching element may be grounded. A second terminal of the second switching element may be connected to a third terminal of the power switching element.

The charge pump circuit in accordance with embodiments may further include a driving element. The driving element may control the first switching element and the second switching element.

The charge pump circuit in accordance with embodiments may further include a second resistance element. The second resistance element may be connected in series to the first charge storage element to limit a discharge current of the first charge storage element.

The driver circuit in accordance with embodiments may further include a second charge storage element. The second charge storage element may be connected between the charge pump circuit and the control circuit and to store charges from the charge pump circuit. The charge pump circuit may perform a charging operation when the power switching element is on. Further, the charge pump circuit may perform a discharging operation when the power switching element is off.

In accordance with embodiments, a circuit is configured to supply power to a drive circuit. The driver circuit drives light-emitting elements and includes at least the following: a control circuit for controlling light-emitting elements. The circuit may include a charge storage element, a power switching element, a second switching element, and a third switching element. The charge storage element may have a first terminal connected to the light-emitting elements. The power switching element may have a first terminal connected to a second terminal of the charge storage element and a second terminal connected to a power supply terminal of the control circuit. The second switching element may include a first terminal connected to a node between the charge storage element and the power switching element. The third switching element may have a first terminal connected to the light-emitting elements and a second terminal connected to the control circuit for receiving a drive signal.

The first and second switching elements may be a diode and the power switching element may be a metal-oxide-semiconductor (MOS) transistor. The first to third switching elements may be MOS transistors.

The circuit in accordance with embodiments may further include a drive element for controlling the first and second switching elements.

DRAWINGS

Figure 1:
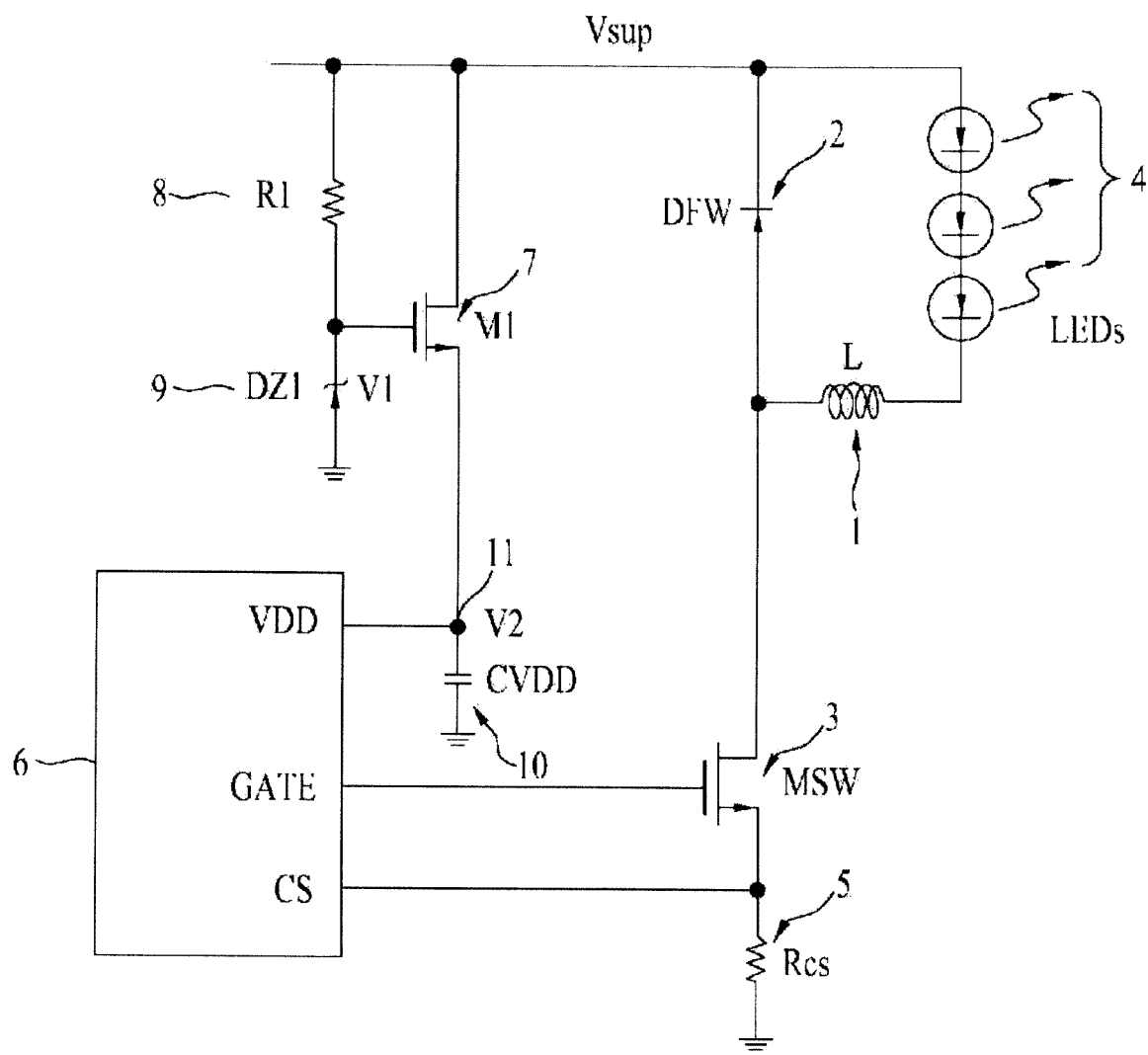
FIG. 1 is a circuit diagram that illustrates a typical driver circuit having an inductor.
Figure 2:
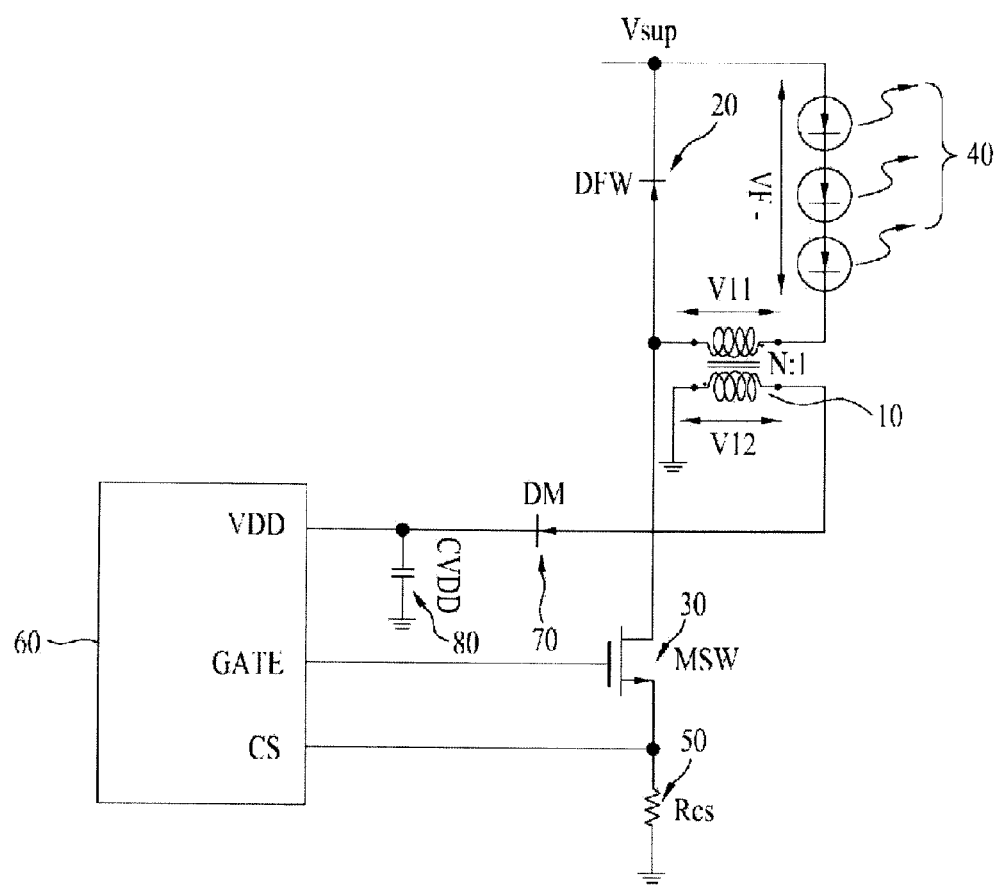
FIG. 2 is a circuit diagram that illustrates a typical driver circuit having a transformer.
Figure 3A:
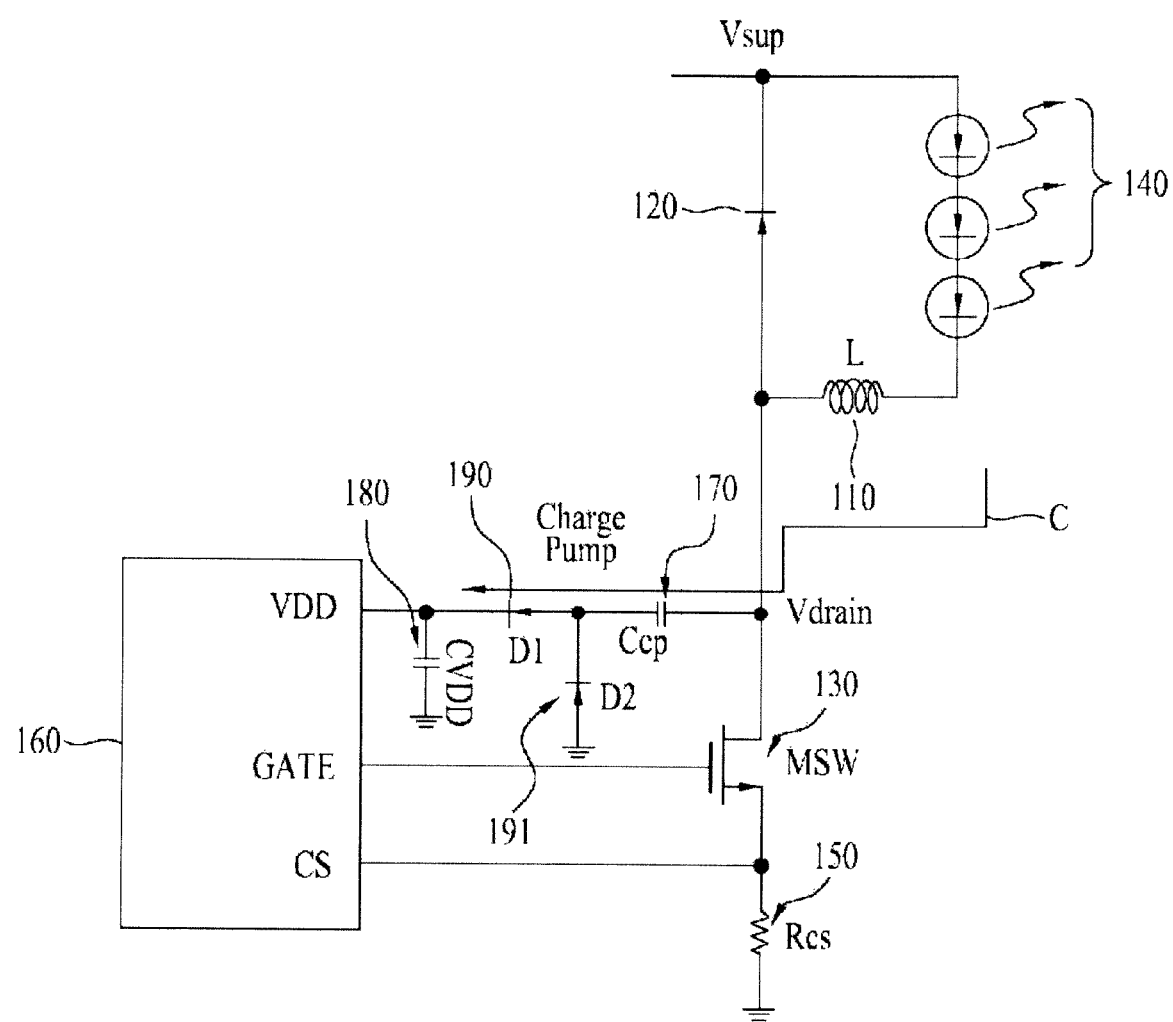
Figure 3B:
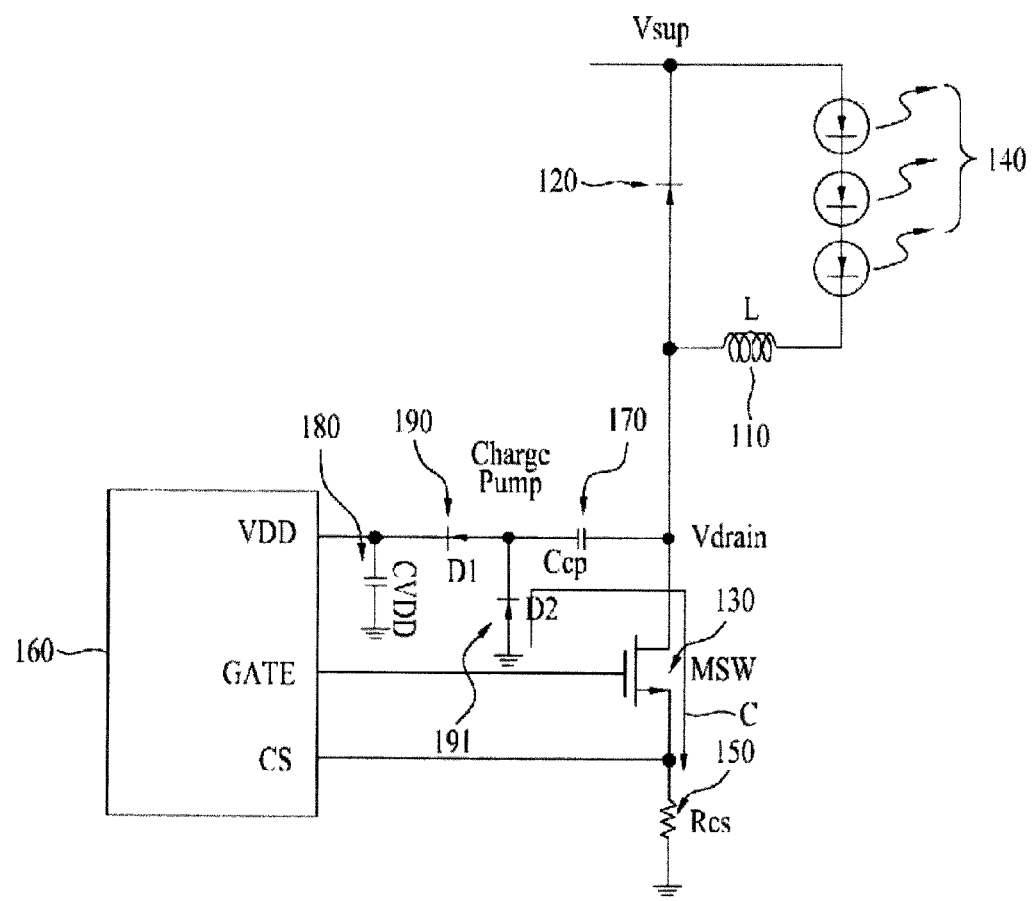

Example FIGS. 3A and 3B are circuit diagrams that illustrate a driver circuit having a charge pump circuit in accordance with embodiments.

Figure 4:
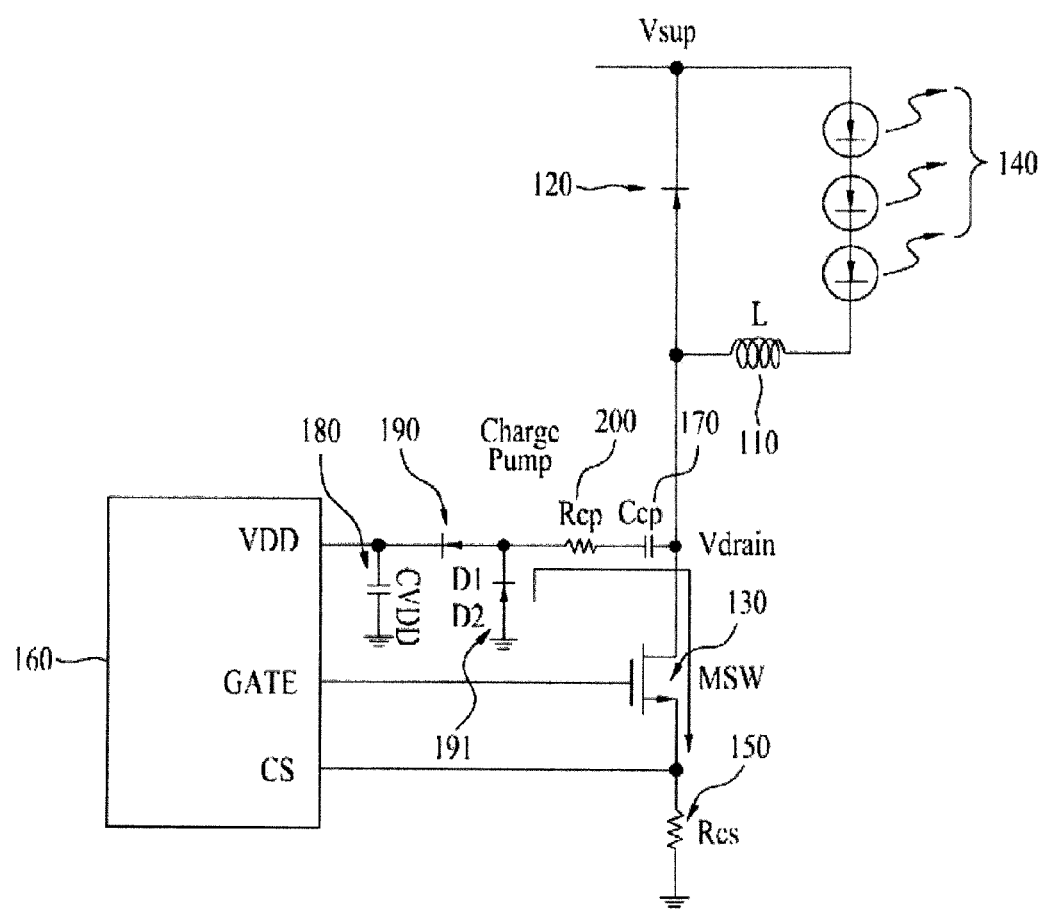

Example FIG. 4 is a circuit diagram that illustrates a driver circuit including a charge pump circuit in accordance with embodiments.

Figure 5:
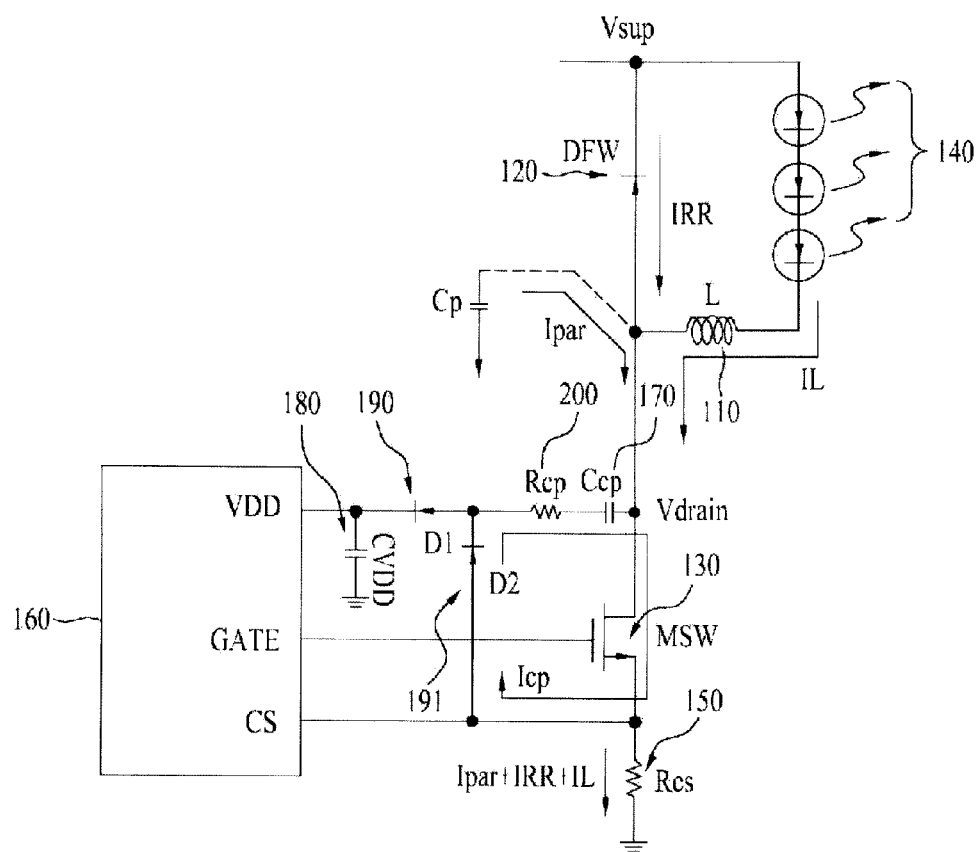

Example FIG. 5 is a circuit diagram that illustrates a driver circuit including a charge pump circuit in accordance with embodiments.

Figure 6:
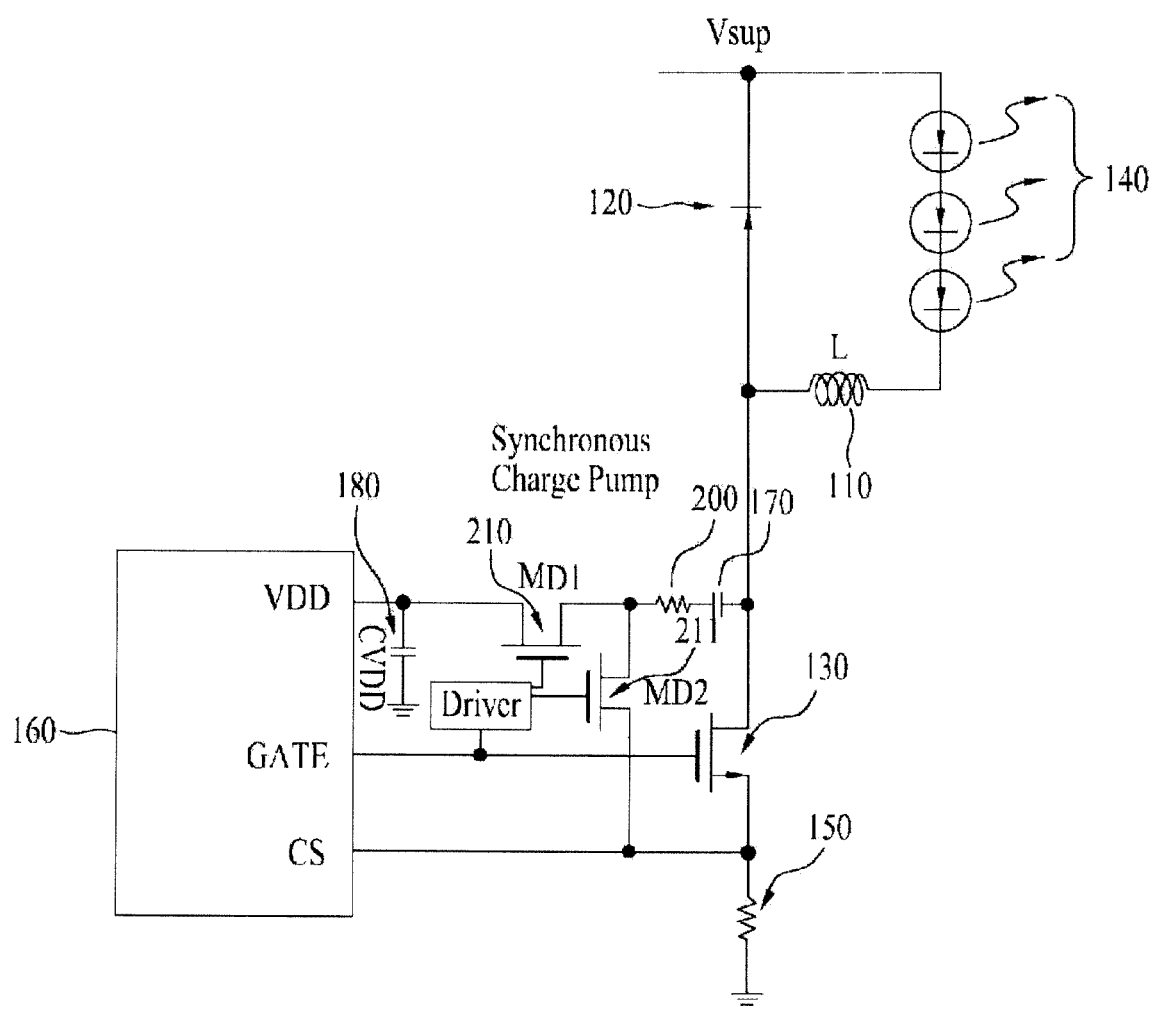

Example FIG. 6 is a circuit diagram that illustrates a driver circuit including a charge pump circuit in accordance with embodiments.

Figure 7A:
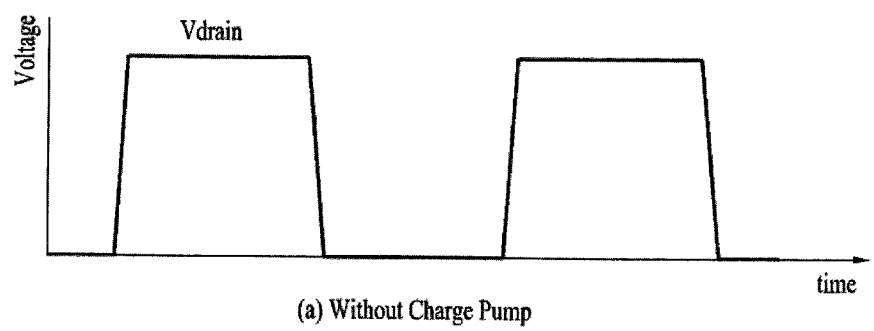
Figure 7B:
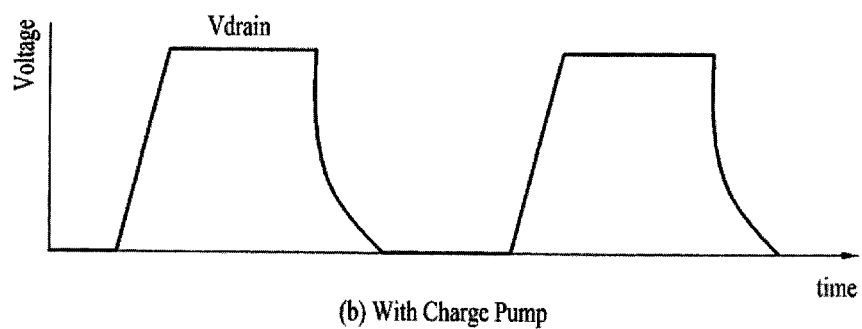

Example FIGS. 7A and 7B are timing diagrams that illustrate changes in a drain voltage of a power switch included in a buck structure of a driver circuit as the power switch is switched on/off.

Figure 8A:
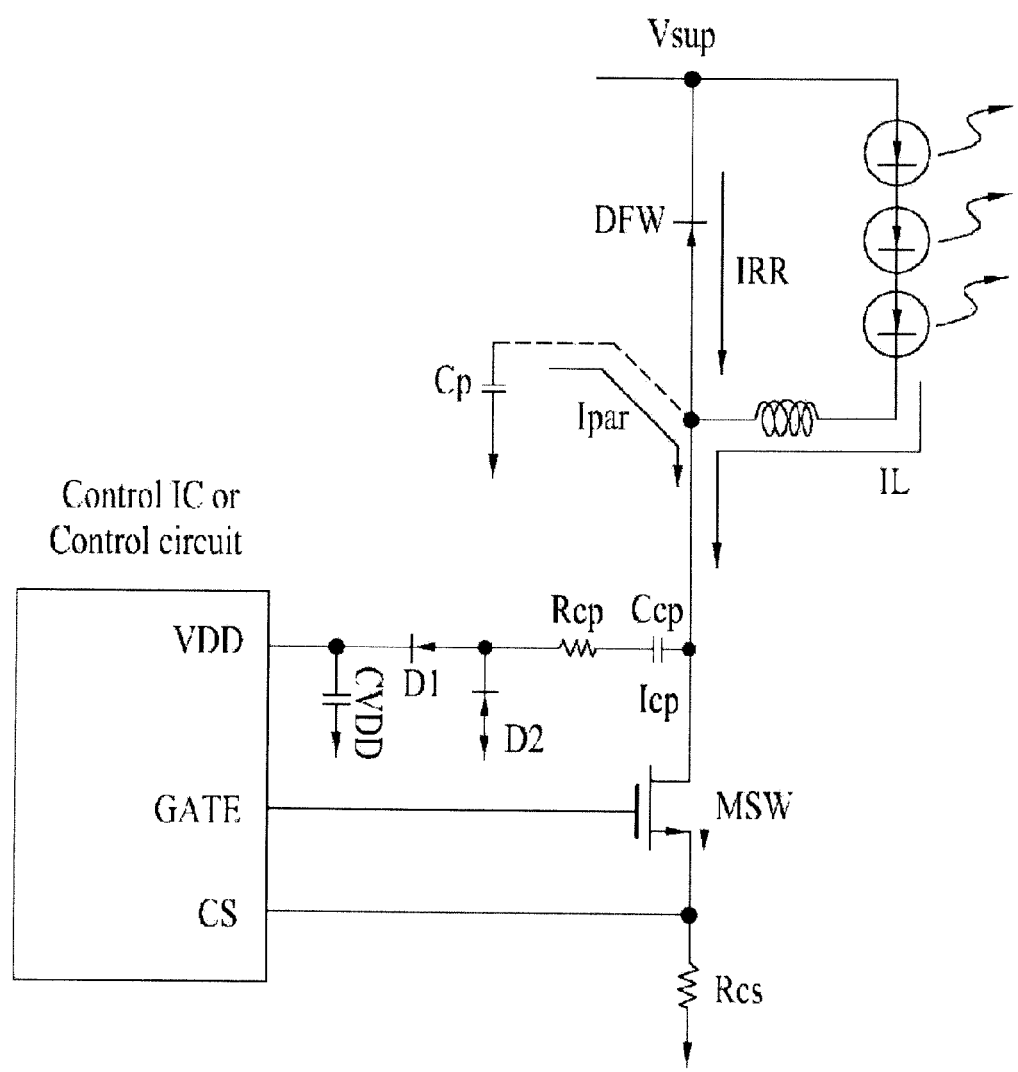

Example FIG. 8A is a circuit diagram that shows current components in the driver circuit of example FIG. 4 when the power switch is turned on.

Figure 8B:
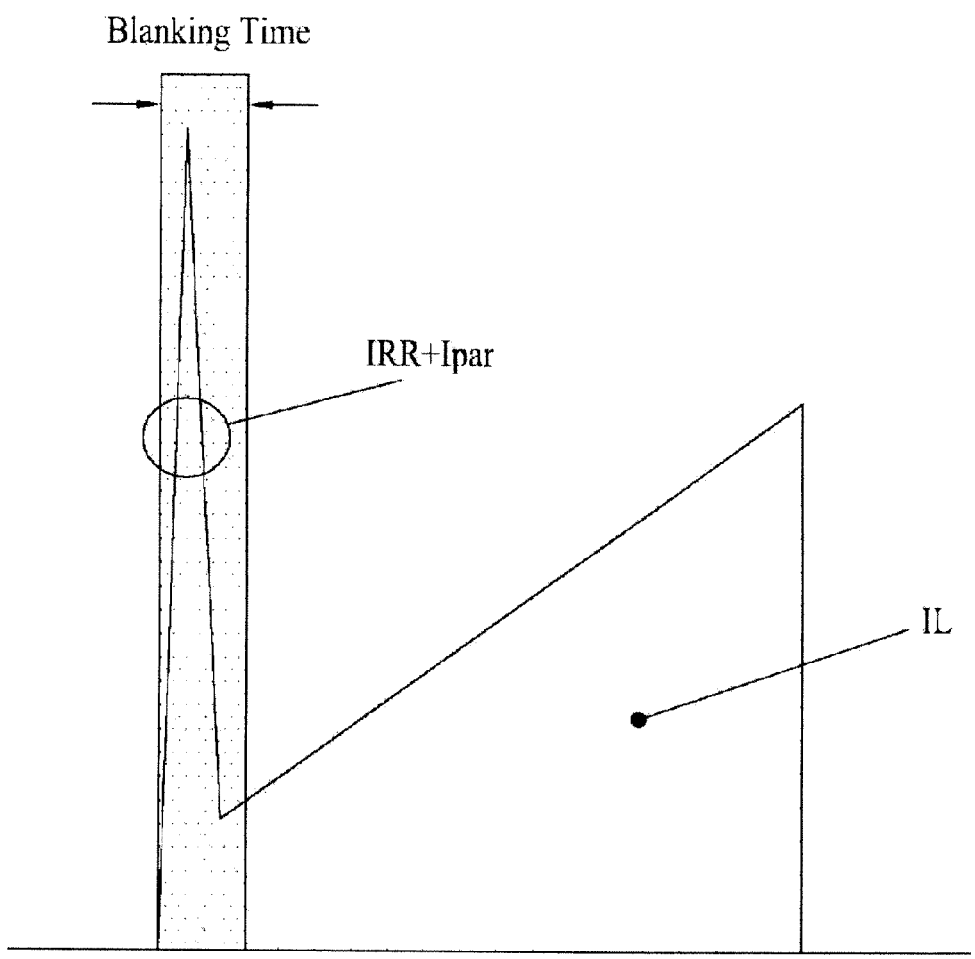
Figure 8C:
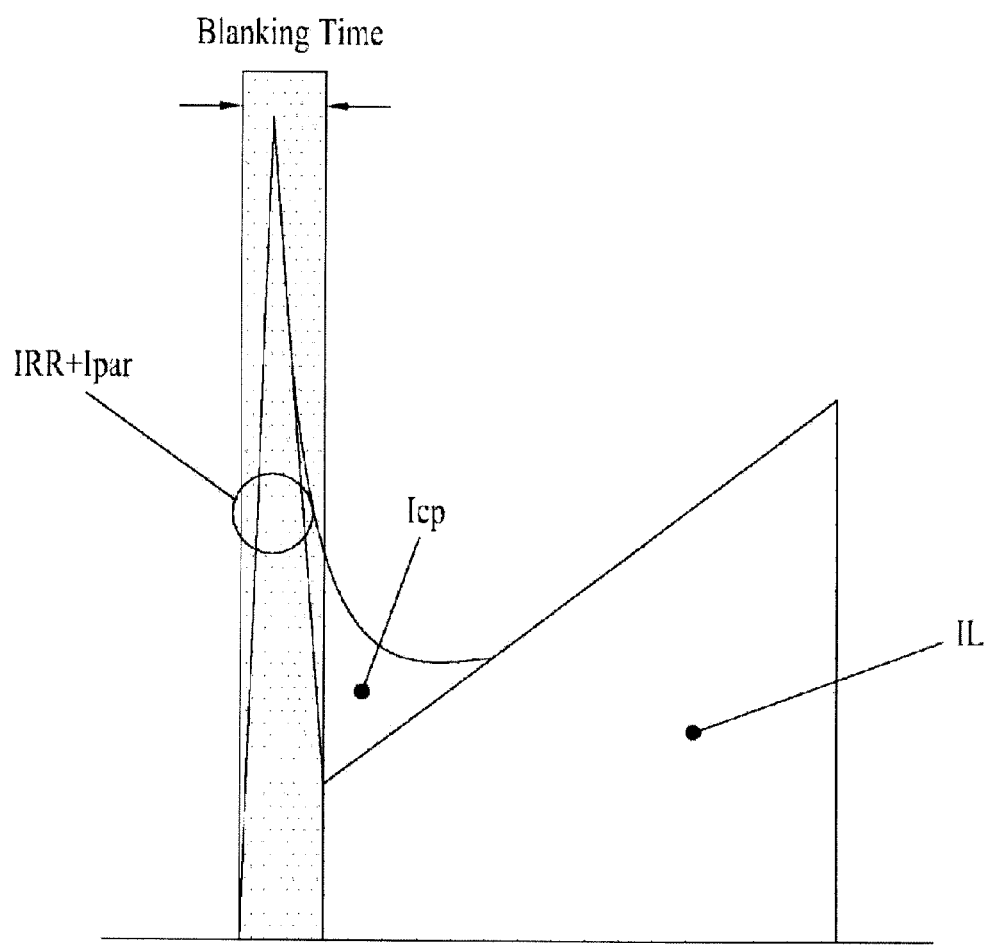

Example FIGS. 8B and 8C are timing diagrams that illustrate waveforms of current flowing through a current sensing resistor Rcs as a power switch is turned on in a driver circuit.

Figure 9:
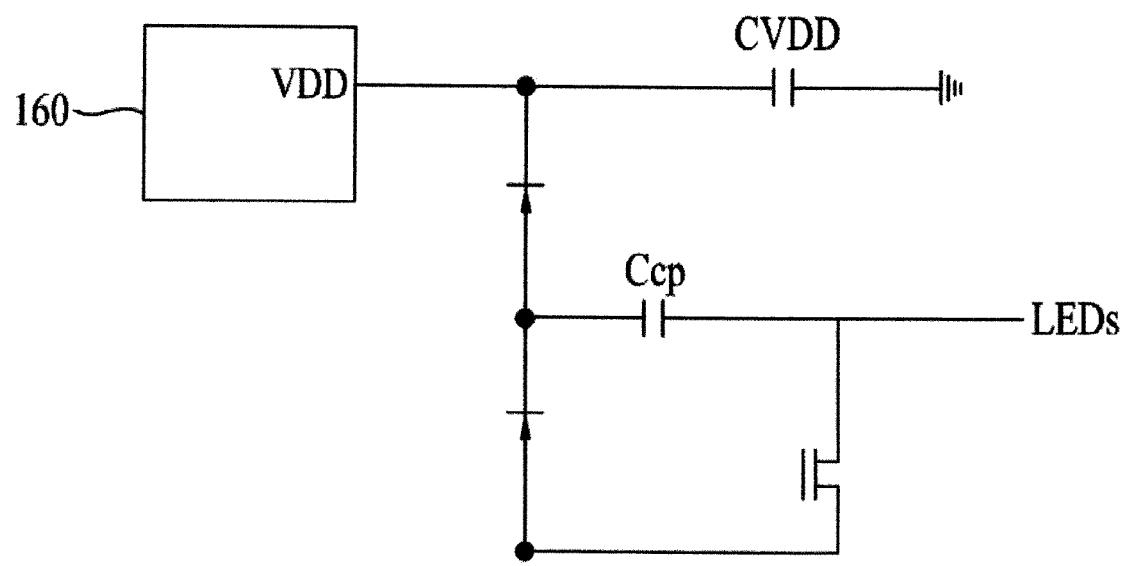

Example FIG. 9 is a circuit diagram that illustrates a charge pump circuit included in a driver circuit in accordance with embodiments.

DESCRIPTION

A driver circuit in accordance with embodiments will be described with reference to the accompanying drawings. The driver circuit in accordance with embodiments is configured to control light-emitting elements, such as light emitting diodes (LEDs). The driver circuit in accordance with embodiments includes a charge pump circuit.

Example FIGS. 3A and 3B are circuit diagrams that illustrate a driver circuit having a charge pump circuit in accordance with embodiments. Particularly, example FIG. 3A illustrates a charge pump circuit that charges a $V_{DD}$ capacitor CVDD, and example FIG. 3B illustrates a $V_{DD}$ capacitor CVDD that discharges current through the charge pump circuit.

As illustrated in example FIGS. 3A and 3B, the driver circuit in accordance with embodiment may include an inductor L 110, a freewheeling diode 120, a power switch MSW 130, light emitting diodes LEDs 140, a current sensing resistor Rcs 150, a control circuit 160, a $V_{DD}$ capacitor CVDD 180, and a charge pump circuit. The driver circuit has a buck structure formed of the inductor 110, the freewheeling diode 120, and the LEDs 4. Unlike the typical driver circuit, the driver circuit in accordance with the embodiment includes the charge pump circuit for charging the $V_{DD}$ capacitor 180.

In accordance with embodiments, the charge pump circuit may be a power supply source for the control circuit 160. For example, the charge pump circuit may charge the $V_{DD}$ capacitor 180 to supply power to the control circuit 160. The charge pump circuit may include a first diode D1 190, a charge pump capacitor Ccp 170, and a second diode D2 191 as illustrated in FIGS. 3A and 3B.

When the power switch 130 is turned on, current flows through the LEDs 140 having predetermined load. As a result, the LEDs 140 are turned on. In example FIGS. 3A and 3B, the LEDs 140 are illustrated as an example of light-emitting elements. Such light-emitting elements include a liquid-crystal display (LCD) backlight, an LED illumination element, and the like.

When the power switch 130 is turned on, the current sensing resistor 150 may detect a current level of current flowing through the inductor 110 and the LEDs 140. The resistor 150 may be connected to the control circuit 160 in order to control current flowing through the LEDs 140. The control circuit 160 may turn on/off the power switch 130 based on the detected current level of the current sensing resistor 150. Such an operation of the current sensing resistor 150 is identically applied to other embodiments. Accordingly, the description thereof will be omitted from descriptions of other embodiments.

When the power switch 130 is switched off, current flows from the inductor 110 to the first diode D1 190 through the charge pump capacitor 170 of the charge pump circuit. As a result, the first diode D1 190 is turned on and the $V_{DD}$ capacitor 180 is charged with power source voltage. After the $V_{DD}$ capacitor 180 is completely charged with the power source voltage, the charge pump circuit interrupts charging the $V_{DD}$ capacitor 180. When the power switch 130 is turned on again, the charge pump capacitor 170 discharges current through the second diode 191 and the power switch 130.

The driver circuit in accordance with embodiments charges the $V_{DD}$ capacitor 180 in order to supply power to the control circuit 160 when the power switch 130 is turned off. The driver circuit in accordance with embodiments discharges the charge pump capacitor Ccp 170 when the power switch 130 is turned on.

As illustrated in example FIGS. 3A and 3B, the driver circuit in accordance with embodiments uses inexpensive elements, such as capacitors and diodes to drive light-emitting elements. Such a driver circuit does not consume current after the VDD capacitor 180 is completely charged because the driver circuit interrupts supplying current to the $V_{DD}$ capacitor 180 after the $V_{DD}$ capacitor 180 is completely charged. Moreover, such a driver circuit advantageously limits current flowing through the first diode 190 because current flowing through the charge pump capacitor Ccp 170 of the charge pump circuit is equal to current flowing through the inductor 110 or the LED 140 while charging the $V_{DD}$ capacitor 180.

Example FIG. 4 is a circuit diagram that illustrates a driver circuit including a charge pump circuit in accordance with embodiments. Unlike the driver circuit of FIGS. 3A and 3B, the charge pump circuit of example FIG. 4 may additionally include a charge pump resistor Rep 200.

As illustrated in example FIG. 4, the charge pump circuit in accordance with embodiments may include the charge pump resistor 200 in addition to a first diode D1 190, a second diode D2, and a charge pump capacitor Ccp 170. The charge pump resistor 200 may limit current discharging from the charge pump capacitor 170 when the charge pump capacitor 170 discharges current. The driver circuit of example FIG. 4 additionally includes the charge pump resistor 200 to prevent excessive discharge current of the charge pump capacitor 170 from flowing through the power switch 130 and the second diode 191 when the charge pump capacitor 170 discharges current.

Example FIGS. 7A and 7B are timing diagrams that illustrate changes in a drain voltage $V_{drain}$ according to switching operation of a power switch included in a buck structure of a driver circuit. Particularly, example FIG. 7A illustrates drain voltage variation in a driver circuit not including a charge pump circuit, and example FIG. 7A illustrates drain voltage change in a driver circuit including a charge pump circuit in accordance with embodiments.

As illustrated in the timing diagram of example FIG. 7A, the drain voltage raises and falls with a steep gradient because the driver circuit does not perform charging or discharging operation due to the absence of a charge pump circuit.

As illustrated in the timing diagram of example FIG. 7B, the drain voltage raises and falls with a gentle gradient because of the charge pump circuit in the driver circuit in accordance with embodiments.

Referring back to example FIG. 4, the charge pump resistor 200 limits current that flows through the charge pump capacitor 170 of the charge pump circuit or current that discharges from the charge pump capacitor 170. Accordingly, the drain voltage of the power switch 130 raises and falls with a relatively gentle gradient as illustrated in example FIG. 7B.

In general, the buck structure of the driver circuit may generate electromagnetic interference (EMI) noise. Such EMI noise may increase when the drain voltage varies with a steep gradient as illustrated in FIG. 7A. The driver circuit in accordance with embodiments can reduce the EMI noise by using the charge pump circuit to supply power to light-emitting elements, such as LEDs.

Example FIG. 5 is a circuit diagram that illustrates a driver circuit including a charge pump circuit in accordance with embodiments. Particularly, the driver circuit of example FIG. 5 may have an improved structure that ensures a control circuit 160 to properly control LEDs 140. In the driver circuit of example FIG. 5, discharge current flow is changed to ensure proper operation of the control circuit 160.

As illustrated in example FIG. 5, the driver circuit of FIG. 5 may include a second diode D2 191 connected in parallel between a control circuit 160 and a current sensing resistor Rcs 150. That is, the second diode 191 of FIG. 5 is not grounded unlike the driver circuit of FIGS. 3A, 3B, and 4. The second diode 191 forms a closed loop together with a charge pump capacitor Ccp 170, a charge pump resistor Rcp 200, and a power switch MSW 130, which are connected in series in the charge pump circuit. Accordingly, current discharging from the charge pump capacitor 170 is consumed in the closed loop while circulating in the closed loop.

In accordance with embodiments, the driver circuit illustrated in example FIGS. 3A and 3B may employ the circuit structure illustrated in example FIG. 5. For example, the second diode 191 of example FIG. 3 may be connected between the control circuit 160 and the current sensing resistor 150 in parallel without being grounded. Since one ordinary skilled in the art can fully understand such modification of the driver circuit of example FIGS. 3A and 3B, a detailed description thereof is omitted herein.

The driver circuit in accordance with embodiments may include three current components that flow in three different current paths when the power switch 130 is on. Example FIG. 8A illustrates current components in the driver circuit of example FIG. 4. The current components may include inductor current IL, reverse recovery current IRR, and discharge current Icp. As illustrated in example FIG. 8A, the inductor current IL flows through the inductor 110, and the reverse recovery current IRR flows through a freewheeling diode DFW 120. The discharge current Icp flows through the capacitor Ccp 170 of the charge pump circuit. In addition, parasitic current Ipar may flow through a parasitic capacitor.

Example FIGS. 8B and 8C are timing diagrams that illustrate waveforms of current flowing through a current sensing resistor Rcs that detects current flowing through an inductor L and LEDs according to a switching operation of a power switch in a driver circuit. Particularly, example FIG. 8B illustrates waveforms of current flowing through a resistor in a driver circuit without a charge pump circuit. Example FIG. 8C illustrates waveforms of current flowing through the resistor 150 in the driver circuit including the charge pump circuit in accordance with embodiments.

In ideal condition, only inductor current IL flows through the current sending resistor 150 when the power switch is turned on. In reality, reverse recovery current IRR and parasitic current Ipar also flow through the current sensing resistor 150 together with the inductor current IL for a certain amount of time after the power switch 130 is turned on. In order to control the current sensing resistor 150 not to sense current, a blanking time is predetermined. The blanking time may be determined and set in consideration of a time that the discharge current Icp of the charge pump capacitor 170 flows through the current sensing resistor 150 in case of using the charge pump circuit. If the blanking time is set to be too long, however, a time for detecting the inductor current IL becomes too short. Accordingly, the control circuit 160 may not properly perform a control operation.

When a charge pump circuit is not included in a driver circuit, the blanking time may be set based on a duration time that the reverse recovery current IRR and the parasitic current Ipar flow through the resistor Rcs 150. When a charge pump circuit is included in the driver circuit in accordance with embodiments, the discharge current Icp of the current sensing capacitor 170 flows through the current sensing resistor Rcs 150 in addition to the reverse recovery current IRR and the parasitic current Ipar. The discharge current Icp flows through the current sensing resistor 150 for a comparatively long time. The current sensing resistor 150 may detect both the discharge current Icp and the inductor current IL even after a lapse of the blanking time. Accordingly, the current sensing resistor 150 cannot detect only the inductor current IL. When the switching on/off time interval of the power switch MSW 130 is shortened, the current sensing resistor 150 senses the discharge current Icp together with the inductor current IL for a further longer time after a lapse of the blanking time.

The driver circuit of example FIG. 5 enables the current sensing resistor 150 to detect only the inductor current IL after a lapse of the blanking time. As illustrated in example FIG. 5, the second diode 191 is not grounded. Particularly, an anode of the second diode 191 is connected to a source of the power switch 130. Such a circuit structure eliminates the discharge current Icp through a closed loop. In such a circuit structure, the discharge current Icp of the charge pump capacitor 170 does not flow through the current sensing resistor 150 when the power switch 130 is turned on. The discharge current Icp is consumed through the closed loop formed of the second diode 191, the charge pump resistor 200, the charge pump capacitor 170, and the power switch 130.

Accordingly, for the driver circuit of example FIG. 5, the blanking time can be set identical to that for a driver circuit including no charge pump circuit because the discharge current Icp of the charge pump capacitor 170 does not flow through the current sensing resistor 150.

Example FIG. 6 is a circuit diagram that illustrates a driver circuit including a charge pump circuit in accordance with embodiments. The driver circuit of example FIG. 6 includes the charge pump circuit constructed of active elements.

As illustrated in example FIG. 6, the driver circuit of FIG. 6 has a similar structure compared to that of example FIG. 5. Unlike the driver circuit of FIG. 5, the driver circuit of FIG. 6 includes a switching element instead of diodes. The driver circuit of FIG. 6 includes a p-channel metal-oxide-semiconductor (PMOS) transistor MD1 210 instead of the first diode D1 and an n-channel metal-oxide-semiconductor (NMOS) transistor MD2 211 instead of the second diode D2. Although the driver circuit of FIG. 6 includes two active elements, a PMOS transistor and an NMOS transistor instead of two diodes D1 and D2, the driver circuit in accordance with embodiments may include one active element instead of one of the diodes D1 and D2.

The driver circuit of FIG. 6 may further include a driver 230 for driving the PMOS transistor 210 and the NMOS transistor 220. The PMOS transistor 210 and the NMOS transistor 220 may implement a synchronous charge pump with the driver 230. The driver 230 may alternately turn on the PMOS transistor 210 and the NMOS transistor 211 when one of a charging operation and a discharging operation is performed according to switching of the power switch 130. The driver 230 may prevent both the PMOS transistor 210 and the NMOS transistor 211 from being simultaneously on while one of the charging operation and the discharging operation is being performed according to the switching operation of the power switch 130. This is because the $V_{DD}$ capacitor 180 discharges current when both the PMOS transistor 210 and the NMOS transistor 211 are on.

The driver 230 is connected to the control circuit 160, particularly, to a drive signal output terminal GATE thereof. The driver 230 outputs the drive signal to a gate of the power switch 130. That is, both the gate of the power switch 130 and the driver 230 are connected to the drive signal output terminal GATE of the control circuit 160. Accordingly, the driver 230 operates in synchronization with the drive signal applied to the gate of the power switch MSW 130.

For example, when the control circuit 160 outputs a drive signal for turning on the power switch 130, the driver 230 turns on the NMOS transistor 211 since a discharging operation should be performed in the charge pump circuit. At this time, the PMOS transistor 210 is off. On the other hand, when the power switch 130 is off, the driver 230 turns on the PMOS transistor 210 since a charging operation should be performed in the charge pump circuit. At this time, the NMOS transistor 211 is off. Since on resistance of each active element is comparatively small, conduction loss can be reduced when the active elements are included in the driver circuit instead of diodes.

Example FIG. 9 is a circuit diagram that illustrates a charge pump circuit in accordance with embodiments. Like reference numerals are designated to like elements through FIGS. 4 to 6, and 9. The driver circuit in accordance with embodiments may include at least one of light-emitting elements, such as LEDs 140, and a control circuit 160 for controlling the LEDs 140. The driver circuit may further include a charge pump circuit as a power supply circuit in order to drive the control circuit 160.

As illustrated in FIG. 9, the charge pump circuit may charge a $V_{DD}$ capacitor (CVDD) 180 connected between ground and a power input terminal VDD of the control circuit 160. The charge pump circuit may include a first switching element, a second switching element, a power switching element, and a charge pump capacitor Ccp 170.

The first switching element may be connected in parallel between the $V_{DD}$ capacitor 180 and the power input terminal VDD of the control circuit 160. The first switching element may be a diode, a MOS transistor, or the like. Particularly, the first switching element may be one of the first diode 190 or the PMOS transistor 210 in example FIGS. 4 through 6. The second switching element may be connected in series to the first switching element. The second switching element may be a diode, a MOS transistor, or the like. The second switching element may be one of the second diode 191 or the NMOS transistor 220 in example FIGS. 4 through FIG. 6.

The charge pump capacitor Ccp 170 may be connected in parallel between the first switching element and the second switching element. The power switching element may include a drain connected to the charge pump capacitor 170 and a source connected to the second switching element. The power switching element 130 may include a gate connected to the drive signal output terminal GATE of the control circuit 160 to receive a driver signal from the control circuit 160. Accordingly, the third switching element 130 may operation in response to the drive signal from the control circuit 160.

As described above, the driver circuit in accordance with embodiments has an advantage of enabling the buck structure to reliably operate without using a transformer which is difficult to manufacture as compared to an inductor. Such a driver circuit also has advantages of low manufacturing cost and low power consumption because it does not require expensive switching elements.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A circuit which supplies power to a drive circuit which drives light-emitting elements, the drive circuit including a control circuit which controls light-emitting elements, the circuit comprising:
a charge storage element having a first charge storage element terminal and a second charge storage element terminal, the first charge storage element terminal being connected to the light-emitting elements;
a power switching element configured to include a first power switching element terminal connected to the second charge storage element terminal and a second power switching element terminal connected to a power supply terminal of the control circuit;
a second switching element configured to include a first switching element terminal connected to a node between the charge storage element and the power switching element; and
a third switching element configured to include a second switching element terminal connected to the light-emitting elements and a third switching element terminal connected to the control circuit and configured to receive a drive signal.

2. The circuit of claim 1, wherein:
the first switching element and the second switching elements each comprise a diode; and
the power switching element comprises a metal-oxide-semiconductor (MOS) transistor.

3. The circuit of claim 1, wherein the first switching element, the second switching element and the third switching element each comprise an MOS transistor.

4. The circuit of claim 3, further comprising a drive element configured to control the first switching element and the second switching element.

5. A driver circuit for driving light-emitting elements, the driver circuit comprising:
a light-emitting element;
a power switching element having a first power switching element terminal connected to the light-emitting element and a second power switching element terminal;
a control circuit connected to the second power switching element terminal and configured to control a switching operation of the power switching element; and
a charge pump circuit connected between the control circuit and a power source for the light-emitting element and configured to supply current to the control circuit, wherein the charge pump circuit is connected between a power supply terminal of the control circuit and a first node between the first power switching element terminal and the light-emitting element and the charge pump circuit comprises:
a first charge storage element having a first charge storage element terminal connected to the first node and a second charge storage element terminal connected to the power supply terminal of the control terminal,
a first switching element having a first switching element terminal connected to the first charge storage element in series and a second switching element terminal connected to the power supply terminal of the control circuit, and
a second switching element having a third switching element terminal connected to the second node between the first switching element terminal of the first switching element.

6. The driver circuit of claim 5, further comprising:
a first resistance element connected to a third power switching element terminal of the power switching element,
wherein the control circuit is configured to detect current flowing through the first resistance element and control the operation of the power switching element based on the detected current.

7. The driver circuit of claim 5, wherein the second switching element further includes a fourth switching element terminal which is grounded.

8. The driver circuit of claim 5, wherein a fourth switching element terminal of the second switching element is connected to a third power switching element terminal of the power switching element.

9. The driver circuit of claim 8, wherein the charge pump circuit further includes a driving element configured to control the first switching element and the second switching element.

10. The driver circuit of claim 5, wherein the charge pump circuit further includes a second resistance element that is connected in series to the first charge storage element to limit a discharge current of the first charge storage element.

11. The driver circuit of claim 5, further comprising a second charge storage element connected between the charge pump circuit and the control circuit and configured to store charges from the charge pump circuit.

12. The driver circuit of claim 7, wherein the charge pump circuit is configured to:
perform a charging operation when the power switching element is on; and
perform a discharging operation when the power switching element is off.

13. A driver circuit comprising:
a light-emitting element;
a power switching element connected to the light-emitting element, the power switching element having first, second and third power switching element terminals;
a first resistance element connected to the third power switching element terminal;
a control circuit connected to the power switching element and configured to detect current flowing through the first resistance element and control the operation of the power switching element based on the detected current; and a charge pump circuit connected between the control circuit and the light-emitting element and configured to drive the control circuit, wherein the charge pump circuit is connected between a power supply terminal of the control circuit and a first node between the first power switching element terminal and the light-emitting element and the charge pump circuit comprises:
- a first charge storage element having a first champ storage element terminal connected to the first node and a second charge storage element terminal connected to the power supply terminal of the control terminal,
- a first switching element having a first switching element terminal connected to the first charge storage element in series and a second switching element terminal connected to the power supply terminal of the control circuit, and a second switching element having a third switching element terminal connected to the second node between the first switching element terminal of the first switching element.

14. The driver circuit of claim 13, wherein the light-emitting element includes a power source.

15. The driver circuit of claim 14, wherein the charge pump circuit is connected between the control circuit and the power source.

16. The driver circuit of claim 13, wherein the control circuit is connected to the second power switching element terminal.

* * * * *